Dec. 30, 1924.

C. BERGMANN, JR 1,521,421

AUTOMATIC CLUTCHING OR STARTING DEVICE

Filed Oct. 11, 1921

Inventor:
Carl Bergmann, Jr.,
By Attorneys,
Fraser Turk & Myers

Patented Dec. 30, 1924.

1,521,421

UNITED STATES PATENT OFFICE.

CARL BERGMANN, JR., OF WEST HOBOKEN, NEW JERSEY, ASSIGNOR OF ONE-HALF TO WILLARD W. SILVERNAIL, OF NEWARK, NEW JERSEY.

AUTOMATIC CLUTCHING OR STARTING DEVICE.

Application filed October 11, 1921. Serial No. 507,027.

*To all whom it may concern:*

Be it known that I, CARL BERGMANN, Jr., a citizen of the United States of America, residing in West Hoboken, in the county of Hudson and State of New Jersey, have invented certain new and useful Improvements in Automatic Clutching or Starting Devices, of which the following is a specification.

This invention relates to automatic clutching or starting devices, especially such as are used in connection with internal combustion engines, and aims to provide improvements therein.

The present invention provides a device which is of an improved nature as regards a resilient and easy action in starting, and it further provides a simple, efficient and cheaply manufactured device.

An embodiment of the invention is illustrated in the accompanying drawing, wherein—

Figure 1:
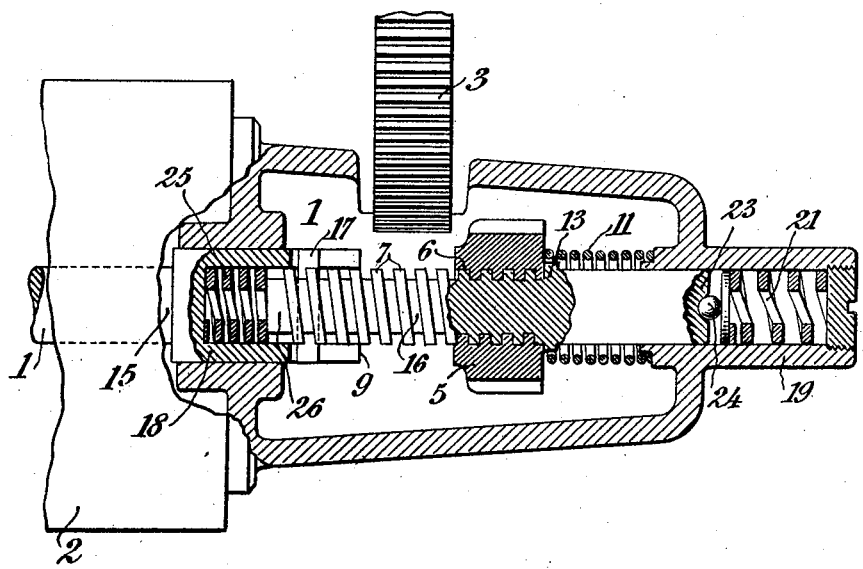
Figure 1 is a view of said embodiment principally in vertical section, and showing so much of a starting motor and of an engine as is necessary to understand the invention.
Figure 2:
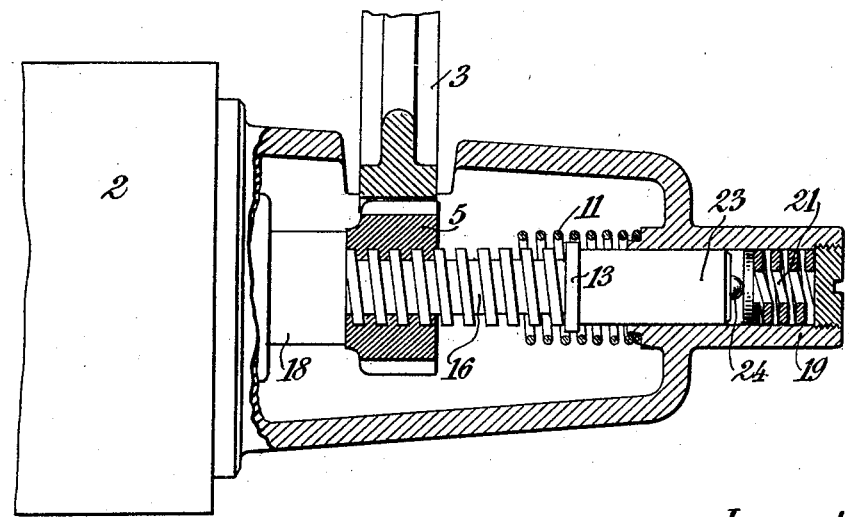
Fig. 2 is a view similar to Fig. 1, showing the starting motor geared with, or clutched to, the internal combustion engine.

Referring to said drawing, numeral 1 designates a driving shaft, the said driving shaft being conveniently a prolongation of the rotor shaft of an electric motor 2. Numeral 3 designates the part which is driven by the starting device, as for example, the fly wheel of the engine, provided with gear teeth on its periphery.

A gear 5, on the shaft 1 is provided for engaging the part or gear 3, the arrangement of the parts being such that an automatic engagement and disengagement of the starting motor 2 and the engine part 3 may be effected through the driving part or gear 5. To this end, interengaging threads 6, 7, are provided on the shaft 1 and the driving gear 5.

When the motor 2 is energized and the driving shaft 1 is rotated, the threads 7 thereon turn in the threads 6 of the gear 5, owing to the inertia of the said gear 5, and the said gear 5 is drawn of fed toward and into engagement with the driven gear 3. Suitable means, as a shoulder or stop 9, is provided for limiting the movement of the driving gear 5 along the shaft 1 after said driving gear 5 has become fully engaged with the driven gear 3.

Suitable means, as a coil spring 11, may be provided for retarding, or effecting a drag upon, the rotation of the driving gear 5, while the said gear is being moved or fed into engagement with the gear 3, thus acting similarly to the inerita of said driving gear 5. This spring 11 is preferably of a length, when extended, to not bear upon the gear 5 in its positive engagement into the gear 3.

When the internal combustion engine starts, and the driven gear 3 becomes driven by the engine, the peripheral speed of the said gear 3 will exceed that of the driving gear 5, the consequence of which will be that the gear 5 will be turned relatively to the driving shaft 1, and fed or carried by the threads 6 and 7 out of engagement with the said driven gear 3. A shoulder 13 may be provided on the driving shaft 1 for limiting the movement of the driving gear 5 out of engagement with the driven gear 3. After the internal combustion engine has been started the starting motor 2 is ordinarily de-energized, leaving the driving gear 5 out of engagement with the driven gear 3, as illustrated in Fig. 1.

Means are preferably provided for cushioning the application of the driving force of the starting motor 2 to the driven gear 3, through the said gear 5. For this purpose the driving shaft 1 is conveniently made in two sections 15, 16. These sections are keyed so as to turn together, and also to permit longitudinal movement of the section 16, as indicated at 17. One end of the shaft 16 conveniently has bearing in a socket, 18 in the shaft section 15, and the other end conveniently has bearing in an outboard bearing 19. A spring or the like 21, is provided and arranged to bear upon the shaft section 16 in such manner as to oppose longitudinal movement thereof. Conveniently the spring 21 is housed within a socket in the bearing 19, and bears upon the end 23 of said shaft section 16 through a ball 24, for reducing friction. A spring 25 may be provided in the socket 18, for bearing upon the opposite end 26 of the shaft section 16. This latter spring in conjunction with spring 21 serves to hold the shaft section 16 firm, and prevent rattling of said shaft section.

When the driving gear 5 is fed or carried against the shoulder 9, following the starting of the starting motor 2, as heretofore explained, the continued rotation of the shaft 1 will turn the shaft section 16 in the said driving gear 5, thereby moving the shaft section 16 longitudinally and compressing the spring 21. The spring 21 will be continued to be compressed until its reaction is sufficient to press the driving gear 5 against the shoulder 9 tightly enough to overcome the resistance of the automobile engine acting through the gear 3 on the said driving gear 5. Thereupon the driving gear 5 will turn the gear 3, and start the internal combustion engine. When the internal combustion engine is started, the gear 3 running with greater peripheral speed than the gear 5 will turn the driving gear 5 on the said shaft section 16, the first turning of the said gear 5 allowing the shaft section 16 to be moved by the spring 21 longitudinally in the direction of the socket 18, and after the tension of the spring 21 is relaxed, or the springs 21 and 25 come into equilibrium, the further rotation of the gear 3 will carry the gear 5 along the shaft section 16 and out of engagement with the said gear 3.

In the event that the gear 5 strikes the end of a tooth on the gear 3, in moving into engagement, the shaft section 16 will be moved longitudinally against the tension of the spring 21 and when the spring reacts through the shaft section 16 with sufficient force on the gear 5, the said gear will turn, thereby bringing the teeth of the gears 5 and 3 into engagement. Shock and excessive pressure will thereby be avoided when a tooth on the gear 5 strikes the end of a tooth on the gear 3 when said gears are moving into engagement.

The invention may receive other embodiments than that herein specifically illustrated and described.

What I claim is:

1. An automatic clutch or starting device comprising a driving shaft, in two alined sections, one of said shaft sections being supported at one end upon and movable axially toward and from the other, means supporting said axially movable shaft section at its other end independently of said shaft, a driving gear on said axially movable shaft section, said axially movable shaft section and gear having a threaded connection, and a driven gear of an engine or the like to be started, said driving shaft, when rotated, being adapted to feed said driving gear into engagement with said driven gear, and said driven gear, when rotated, having a peripheral speed which turns said driving gear faster than said shaft on which it is mounted, whereby said driving gear is fed along said shaft and out of engagement with said driven gear, a stop adapted to limit the feed of said driving gear on said shaft into engagement with said driven gear, and a spring adapted to receive the axial thrust of said axially movable shaft section after said gear comes into contact with said stop.

2. An automatic clutch or starting device comprising a driving shaft, in two alined sections, one of said shaft sections being supported at one end upon and movable axially toward and from the other, means supporting said axially movable shaft section at its other end independently of said shaft, a driving gear on said axially movable shaft section, said axially movable shaft section and gear having a threaded connection, and a driven gear of an engine or the like to be started, said driving shaft, when rotated, being adapted to feed said driving gear into engagement with said driven gear, and said driven gear, when rotated, having a peripheral speed which turns said driving gear faster than said shaft on which it is mounted, whereby said driving gear is fed along said shaft and out of engagement with said driven gear, a stop adapted to limit the feed of said driving gear on said shaft into engagement with said driven gear, and a spring adapted to receive the axial thrust of said axially movable shaft section after said gear comes into contact with said stop, said spring being in line with said alined shaft section.

3. An automatic clutch or starting device comprising a driving shaft, a driving gear thereon, interengaging threads between said shaft and gear, and a driven gear of an engine or the like to be started, said driving shaft, when rotated, being adapted to feed said driving gear into engagement with said driven gear, and said driven gear, when rotated, having a peripheral speed which turns said driving gear faster than said shaft on which it is mounted, whereby said driving gear is fed along said shaft and out of engagement with said driven gear, a stop adapted to limit the feed of said driving gear on said shaft into engagement with said driven gear, and means adapted to cushion the shock with which said driving gear strikes said stop, said shaft having a longitudinally-movable section, and springs acting in opposite directions upon said shaft, one of said springs acting as a part of said cushioning means.

4. An automatic clutch or starting device comprising a driving shaft, a driving gear thereon, interengaging threads between said shaft and gear, and a driven gear of an engine or the like to be started, said driving shaft, when rotated, being adapted to feed said driving gear into engagement with said driven gear, and said driven gear, when rotated, having a peripheral speed which turns said driving gear faster than said shaft on which it is mounted, whereby said driving gear is fed along said shaft and out of engagement with said driven gear, a stop adapted to limit the feed of said driving gear on said shaft into engagement with said driven gear, and means adapted to cushion the shock with which said driving gear strikes said stop, said shaft having a longitudinally-movable section, bearings for said shaft section, one being upon said shaft, sockets in said bearings and springs in said sockets bearing against the ends of said shaft sections, one of said springs comprising a part of said cushioning means.

5. An automatic clutch or starting device, comprising a driving shaft, in two sections, one section being axially movable toward and from the other, a driving gear having threaded engagement with said axially movable shaft section and movable axially thereon, and a driven gear on an engine or the like to be started, said driving shaft, when rotated, being adapted to feed said driving gear into engagement with said driven gear, and said driven gear, when rotated, having a peripheral speed which turns said driving gear faster than said shaft on which it is mounted, whereby said driving gear is fed along said shaft and out of engagement with said driven gear, a stop adapted to limit the feed of said driving gear on said shaft into engagement with said driven gear, and a spring between said axially movable shaft section and a part independently of said shaft, adapted to receive the thrust of said axially movable shaft section after said gear comes into contact with said stop.

6. An automatic clutch or starting device, comprising a driving shaft, in two sections, one section being axially movable toward and from the other, a driving gear having threaded engagement with said axially movable shaft section and movable axially thereon, means supporting said axially movable shaft section at both ends, the means at the outer end being independent of said shaft, and a driven gear of an engine or the like to be started, said driving shaft, when rotated, being adapted to feed said driving gear into engagement with said driven gear, and said driven gear, when rotated, having a peripheral speed which turns said driving gear faster than said shaft on which it is mounted, whereby said driving gear is fed along said shaft and out of engagement with said driven gear, a stop adapted to limit the feed of said driving gear on said shaft into engagement with said driven gear, and a spring adapted to receive the thrust of said axially movable shaft section after said gear comes into contact with said stop.

In witness whereof, I have hereunto signed my name.

CARL BERGMANN, Jr.